United States Patent [19]

Loest et al.

[11] 4,008,307
[45] Feb. 15, 1977

[54] PRODUCTION OF MONOBASIC POTASSIUM PHOSPHATE BY ION EXCHANGE

[75] Inventors: Kent W. Loest, Broomfield; Vernon R. Ewing, Denver, both of Colo.

[73] Assignees: Southwire Company, Carrollton, Ga.; National Steel Corporation, Pittsburgh, Pa.; Earth Sciences, Inc., Golden, Colo.

[22] Filed: June 2, 1975

[21] Appl. No.: 582,807

[52] U.S. Cl. .............................. 423/120; 423/305; 423/313; 423/127; 423/629; 423/181
[51] Int. Cl.² ............... C01B 15/16; C01B 25/26; C01F 1/00; C01F 7/02
[58] Field of Search .............. 423/305, 307–313, 423/120, 128, 132, 127, 629, 181; 71/43

[56] References Cited
UNITED STATES PATENTS

| | | | |
|---|---|---|---|
| 1,386,031 | 8/1921 | Silsbee | 423/128 |
| 2,120,840 | 6/1938 | McCullough | 423/305 |
| 2,707,670 | 5/1955 | Munekata et al. | 423/356 |
| 3,595,610 | 7/1971 | Brinkman et al. | 423/307 |
| 3,890,425 | 6/1975 | Stevens et al. | 423/120 X |
| 3,890,426 | 6/1975 | Stevens et al. | 423/120 X |

*Primary Examiner*—Oscar R. Vertiz
*Assistant Examiner*—Gregory A. Heller
*Attorney, Agent, or Firm*—Van C. Wilks; Herbert M. Hanegan; Kermith F. Ross

[57] ABSTRACT

A process for the production of monobasic potassium phosphate from wet process phosphoric acid and potassium sulfate by ion exchange. The application of the process is the production of monobasic potassium phosphate by ion exchange from wet phosphoric acid produced by the reaction of sulfuric acid on apatite rock and by-product potassium sulfate from processes for the recovery of aluminum from alunite.

13 Claims, 3 Drawing Figures

PRODUCTION OF MONOBASIC POTASSIUM PHOSPHATE BY ION EXCHANGE

CROSS-REFERENCES TO RELATED APPLICATIONS

The present invention utilizes potassium sulfate produced as a by-product in the processes for recovering aluminum from alunite ore disclosed in U.S. Pat. applications Ser. Nos. 453,225 now U.S. Pat. No. 3,890,426 and 453,234, now U.S. Pat. No. 3,890,425 filed Mar. 21, 1974 and assigned to a common assignee with this application. The combined processes of these two applications are referred to hereinafter as the basic process.

BACKGROUND OF THE INVENTION

The invention lies in the field of processes for the recovery of aluminum from its ores using crystallization procedures.

The present invention is a combination of the process for producing phosphoric acid from apatite rock by the wet process and the production of aluminum from alunite in accordance with the basic process, the process resulting in the production of aluminum and monobasic potassium phosphate as the products. In the operation of the process, acid produced from apatite rock is cycled directly to the basic process where it is used with by-product potassium sulfate to produce monobasic potassium phosphate by ion exchange.

The basic process is defined by the following process steps, some of which are optional, as illustrated in the flow diagram of the referenced patent applications:

1. roasting particulate alunite concentrate to remove water of hydration;
2. removing sulfur and alkali metal compounds from the roasted ore by a procedure including a final leaching step resulting in a residue, and a solution containing potassium sulfate as a by-product.
3. digesting the residue from the leaching step with caustic solution to convert aluminum values in the residue to soluble aluminate;
4. precipitating silica from the resulting solution of step (3) to leave a solution of aluminate and a residue known as a desilication product consisting essentially of sodium aluminum silicate along with other impurities;
5. precipitating aluminum values from the solution of step (4); and
6. recovering product aluminum from the aluminum values of step (5).

The recited process includes the alternative of recovering by-product potassium sulfate by crystallization as disclosed in U.S. Ser. 453,225 in which some potassium sulfate is bled off from the crystallization step. This potassium sulfate bleed stream is included in the term "by-product potassium sulfate" from the basic process referred to herein. Another alternative in the basic process is circulation of the mother liquor from step (5) which contains sodium hydroxide to the digestion step with some of the mother liquor being bled off from the precipitation step as impurities build up in it. In step (2) of the above-recited process, the sulfur and alkali metal compounds may be removed either by the procedure of U.S. Ser. 453,234 in which the roasted ore is subjected to a reducing roast and then to an oxidizing roast followed by leaching with a solvent, such as water or an alkali metal hydroxide, or by the process of U.S. Ser. 453,225 in which the roasted ore is leached directly, with a solvent, such as with ammonia or alkali metal hydroxide. Both of these step (2) procedures are included in the expression used herein, "roasting and leaching the alunite ore to remove water and compounds of sulfur and alkali metals."

Processes for the production of aluminum and monobasic potassium phosphate must be as economical as possible in order to produce competitive commercial grade products. This necessarily means conducting the production processes with a minimum of process steps and the recovery and utilization of as many by-products as possible. The combination of processes for the production of two or more products with the elimination of processing steps and the recovery and reuse in the combined process of materials which are normally by-products in the single processes is a distinct advantage. This is particularly true in this instance in which the organization producing the products by different processes is the owner ore bodies from which the two products are produced by disconnected processes.

In the production of phosphoric acid from apatite rock by the wet process for sale as such or for use in the manufacture of fertilizer, a high degree of purity of the product is required to make it commercial grade. Concentration and other purification steps are necessary as it cannot be marketed in the impure form in which it is produced. The purification procedure is a substantial item of expense in the production of a saleable product. If the raw phosphoric acid could be used without purification to make a commercial grade product, such as fertilizer, which is saleable with a minimum of purification, it would result in a realization of a higher profit for the phosphoric acid itself due to the elimination of the purification steps. This is especially true when the product is monobasic potassium phosphate because its value and marketability is much greater than that of phosphoric acid and potassium sulfate combined.

Likewise, the recovery of potassium sulfate from potassium sulfate solution resulting from the first leaching step of the basic process normally requires evaporation, crystallization, and other procedures which add to the cost of producing it for sale. Such procedures must be used in order to produce a commercial grade product. Accordingly, as is true with raw phosphoric acid produced by the wet process, if the impure potassium sulfate could be used to produce a commercial grade product, such as, monobasic potassium phosphate, the profit realized for the by-product potassium sulfate from the basic process would in the end be increased as the expensive purification procedures are eliminated.

In the elimination of silica by precipitation as sodium aluminum silicate from the aluminate produced in the digestion step of the basic process, the sodium aluminum silicate is normally discarded as a waste product. If some utility were found for this normally discarded product in the referred to combination of the two separate processes for producing phosphoric acid and aluminum, the economics for producing the end products would be further improved.

Accordingly, it is an object of this invention to provide a combined process for producing phosphoric acid from apatite rock and aluminum from alunite ore in which process steps are eliminated and by-products and normally discarded materials are recovered and reused in the combined process.

SUMMARY OF THE INVENTION

The invention is a combination of the wet process for producing raw phosphoric acid by the reaction of sulfuric acid on apatite rock and the basic process for production of aluminum from alunite ore, in which in the combined process raw phosphoric acid is cycled to the basic process where it is used with by-product potassium sulfate in an ion exchange process to produce monobasic potassium phosphate. The desilication product from the desilication step of the basic process, hereinafter sometimes referred to as "DSP", may be used as a cation ion exchange agent in the ion exchange step of the combined process of this invention. As a result of the combined process, aluminum and a substantially commercial grade monobasic potassium phosphate are produced with the use of reagents which are normally discarded and with the elimination of expensive recovery and purification steps.

By alternately loading and stripping the ion exchange agent in a process which can be made continuous, substantially commercial grade monobasic potassium phosphate and aluminum can be produced.

If the desilication product is used as the cation exchange agent it can first be loaded with potassium ion by contacting it with the by-product potassium sulfate followed by contacting the potassium loaded DSP with raw phosphoric acid to exchange hydrogen ions from the phosphoric acid for sodium ions on the DSP so that monobasic potassium phosphate is formed from the K+ ion and the $H_2PO_4^-$ ion. An analogous phenomenon occurs when other cation exchange agents are used.

If an anion exchange agent is used, it is first loaded with $H_2PO_4^-$ ions by contacting the agent with raw phosphoric acid from the apatite treatment step to replace anions on the agent with $H_2PO_4^-$ ions from the phosphoric acid. The $H_2PO_4^-$ ion loaded anion is then contacted with by-product potassium sulfate from the first leaching step to replace the $H_2PO_4^-$ ions on the agent with $SO_4^{--}$ ions from the potassium sulfate so that monobasic potassium phosphate is formed from the K+ ions and the $H_2PO_4^{--}$ ions. Sulfuric acid is formed as a by-product which can be cycled to the apatite treatment step in the continuous process. The cation ion exchange agent is regenerated with hydrogen ions and the anionic ion exchange agent is regenerated in sulfate ion.

The following ionic equations represent the exchange of ions taking place in the ion exchange step:

CATION EXCHANGE

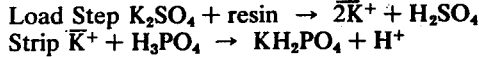

Load Step $K_2SO_4$ + resin → $\overline{2K^+}$ + $H_2SO_4$
Strip $\overline{K^+}$ + $H_3PO_4$ → $KH_2PO_4$ + $H^+$

ANION EXCHANGE

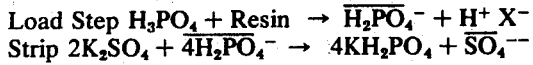

Load Step $H_3PO_4$ + Resin → $\overline{H_2PO_4^-}$ + $H^+$ $X^-$
Strip $2K_2SO_4$ + $\overline{4H_2PO_4^-}$ → $4KH_2PO_4$ + $\overline{SO_4^{--}}$

DESCRIPTION OF THE PREFERRED EMBODIMENT

The specification and drawins of U.S. patent application Ser. No. 453,255, upon which the issue fee has been paid, are incorporated herein by reference and, particularly, the first paragraph of "Summary of the Invention", pages 5–10, page 11 down to the last paragraph, and all of the drawings. The specification and drawings of U.S. patent application Ser. No. 453,234 upon which the issue fee has been paid, are incorporated herein by reference, and particularly, pages 4–8, and the drawings.

Figure 1:
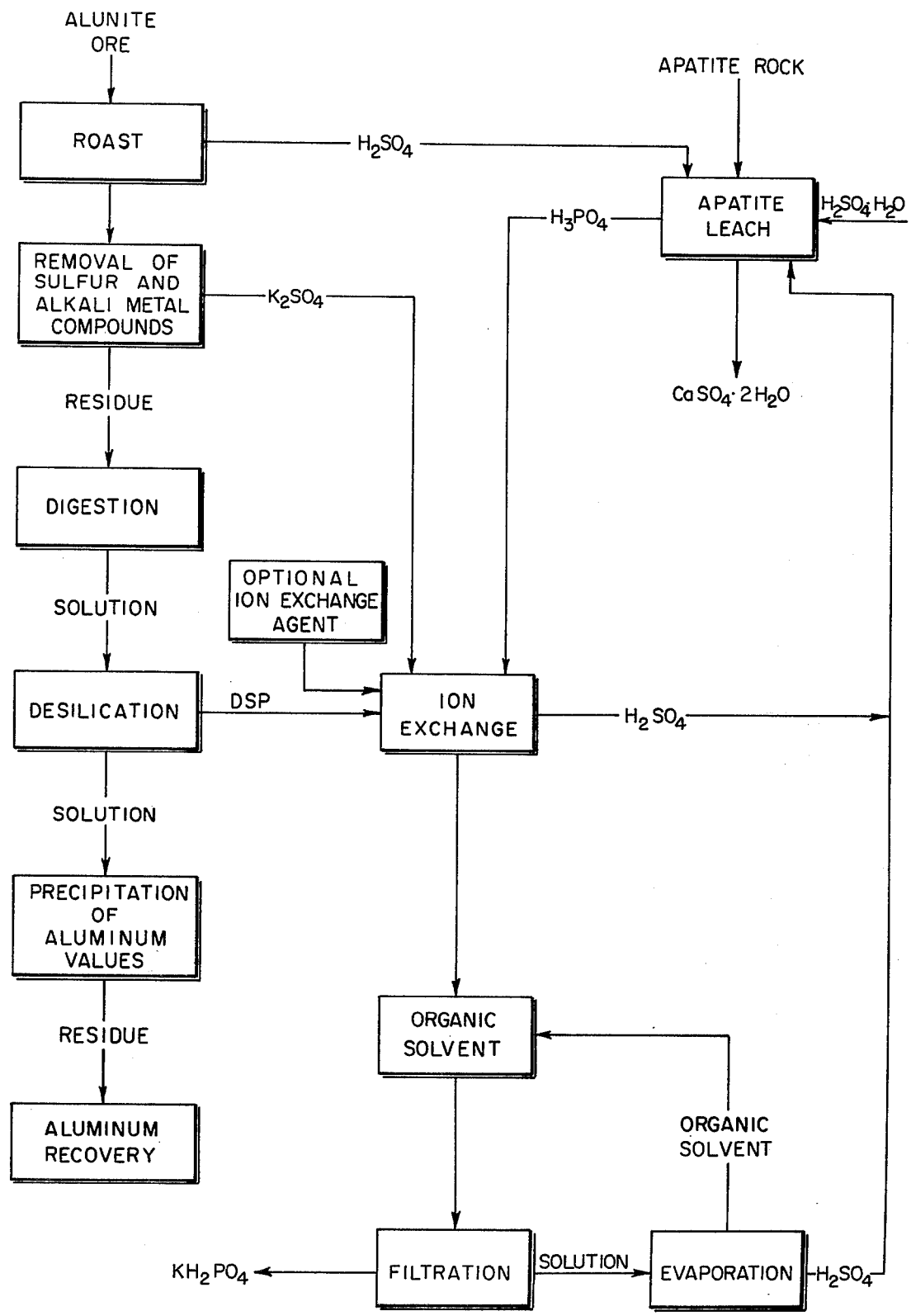
FIG. 1 is a diagrammatic flow sheet of the invention.
Figure 2:
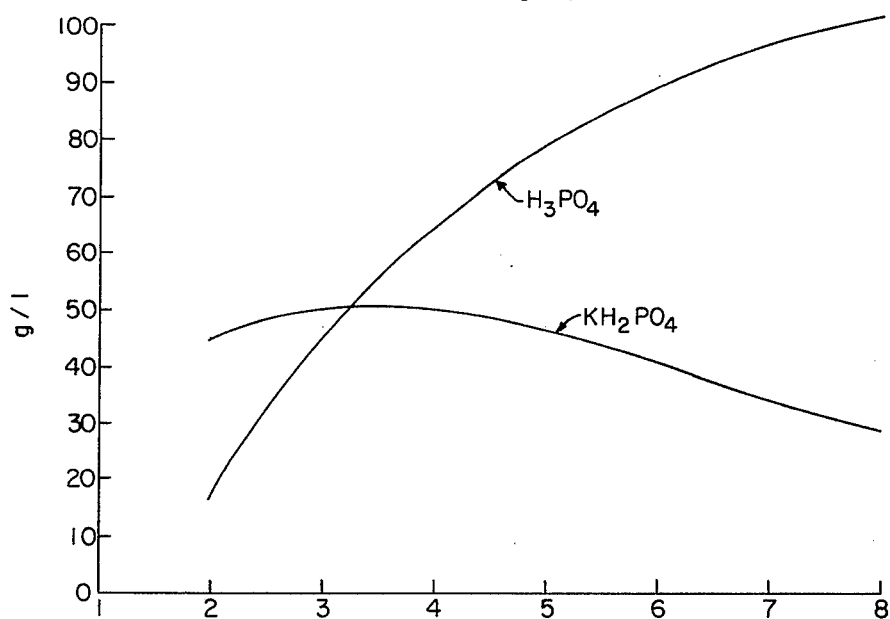
FIG. 2 is a graph illustrating the results of the ion exchange step obtained by using a cation exchange agent.
Figure 3:
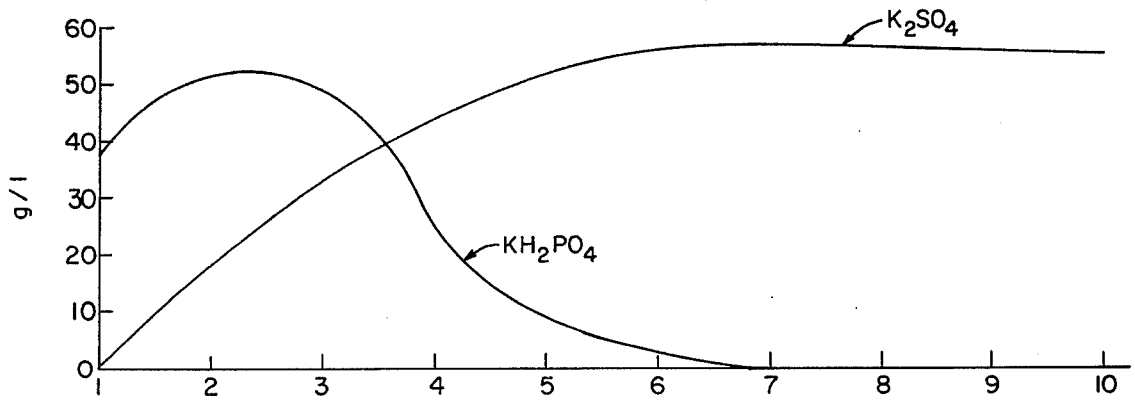
FIG. 3 is a graph illustrating the results obtained in the ion exchange step using an anion exchange agent.

Following the flow diagram of FIG. 1 illustrating the ion exchange step of the present invention, it will be seen that by-product potassium sulfate from the first leaching step of the basic process without purification and also phosphoric acid from the apatite treatment step without purification are simultaneously sent to ion exchange with the formation of monobasic potassium phosphate and sulfuric acid. The monobasic potassium phosphate is recovered by evaporation in the presence of an organic solvent and the by-product sulfuric acid is returned to the apatite leach. DSP from the desilication step may be sent to the ion exchange step for use as the ion exchange agent. Sulfuric acid produced in the alunite leaching step is sent to apatite leach.

The operation of the invention is illustrated by the following examples of the ion exchange step. As shown in the flow diagram of FIG. 1, the process is operated continuously with by-product potassium sulfate from the alunite ore processing step and phosphoric acid from the apatite treatment step being continuously cycled to the ion exchange step. The examples represent results obtained from the ion exchange step as the process is operated continuously.

EXAMPLE I

In this example, a solid cation resin in the hydrogen form was used having a particle size of 20–50 mesh standard, the resin being sold commercially under the tradename "DOWEX 50WX8" by the Dow Chemical Company of Midland, Michigan. The functional group is a sulfonic group in a Styrene-Divinylbenzene copolymer with eight percent (8%) cross-linkage. The resin was placed in a vertical plastic column four (4) foot high and one inch in diameter. The potassium sulfate solution used analyzed 2.7 gpl of potassium sulfate and the raw phosphoric acid analyzed 132.8 gpl of phosphoric acid. The column was first washed three (3) times with de-ionized water and potassium sulfate flowed through the column until the agent was loaded with potassium ion as indicated by the appearance of significant amounts of potassium in the effluent. The potassium loaded agent was then contacted with raw phosphoric acid until the effluent showed significant amounts of phosphoric acid indicating that most of the potassium ions had been displaced with hydrogen ions. Flow rates of liquid through the columns were about 5 mls per minute. The results are set forth in the following table.

TABLE I

| Sample No. | Vol. (ml) | (P)moles | (K)moles | (H)moles | ($H_3PO_4$)gpl | ($KH_2PO_4$)gpl |
| --- | --- | --- | --- | --- | --- | --- |
| 1 | 25 | — | — | — | — | — |
| 2 | 25 | .0339 | .0084 | .00417 | 16.34 | 45.72 |

TABLE I-continued

| Sample No. | Vol. (ml) | (P)moles | (K)moles | (H)moles | $(H_3PO_4)$gpl | $(KH_2PO_4)$gpl |
|---|---|---|---|---|---|---|
| 3 | 25 | .0339 | .0108 | .0119 | 46.63 | 38.79 |
| 4 | 25 | .0339 | .0095 | .0172 | 63.40 | 51.7 |
| 5 | 25 | .0339 | .0090 | .0209 | 81.90 | 48.9 |
| 6 | 25 | .0339 | .0075 | .0234 | 91.70 | 40.8 |
| 7 | 25 | .0339 | .0063 | .0253 | 92.09 | 34.3 |
| 8 | 25 | .0339 | .0056 | .0264 | 103.45 | 30.5 |

The results show that monobasic potassium phosphate was formed almost immediately and that good yields were obtained. A favorable K/P ratio in the monobasic potassium phosphate recovered is indicated. The test was run twice with no apparent deviation in results. The monobasic potassium phosphate produced was substantially free of potassium sulfate as indicated by the fact that application of the standard barium chloride test resulted in no noticeable precipitation of barium sulphate. The 25 ml samples were taken consecutively with no lapse of time between the samples.

EXAMPLE II

In this example, an anion exchange agent was used. The agent is sold commercially under the tradename "MWA" by the Dow Chemical Company of Midland, Michigan. It is in the free amine form and is a macroporous weak base anion exchange agent with the active group being the tertiary amine, $-N-(CH_3)_2$. It has a matrix consisting of a styrene-divinylbenzene copolymer. The potassium sulfate and the phosphoric acid in this example had essentially the same composition as they did in Example I. Flow rates of approximately 5 mls/minute were used. A column like that in FIG. 1 was used. In this example, the column was washed with de-ionized water before ion exchange was begun and after loading and stripping.

The agent was first loaded with $H_2PO_4^-$ anion by contact with phosphoric acid until the appearance of large amounts of phosphoric acid in the effluent. The anion agent loaded with $H_2PO_4^-$ ion was then contacted with potassium sulfate until the appearance of significant sulfate in the effluent indicating that the $H_2PO_4^-$ anion had been substantially replaced by the $SO_4^{--}$ ion.

The results are set forth in the following table:

TABLE II

| Sample No. | Vol. | (k)mole | (P)mole | (S)mole | $K_2(SO_4)$gpl | $(KH_2PO_4)$gpl |
|---|---|---|---|---|---|---|
| 1 | 100ml | 0.00767 | 0.0276 | .0000 | 0 | 37.5 |
| 2 | " | .0588 | 0.0383 | .0115 | 20.0 | 52.0 |
| 3 | " | .0703 | .0392 | .0175 | 30.4 | 53.3 |
| 4 | " | .0703 | .0163 | .0258 | 44.9 | 22.3 |
| 5 | " | .0703 | .0073 | .0307 | 53.4 | 9.93 |
| 6 | " | .0703 | .0014 | .0318 | 55.3 | 1.9 |
| 7 | " | .0703 | .0007 | .0329 | 57.2 | 0.9 |
| 8 | " | .0703 | " | .0328 | 57.1 | " |
| 9 | " | .0703 | " | " | " | " |
| 10 | " | .0703 | " | " | " | " |
| 11 | " | .0703 | " | " | " | " |

Again, the results indicate formation of significant amounts of monobasic potassium phosphate almost immediately. A favorable K/P ratio in the product was obtained. A satisfactory yield of monobasic potassium phosphate was also obtained of significant purity.

The invention is not limited to the particular ion exchange agents used in the examples to illustrate its operation. Other agents may be used, such as, weakly basic macroporous anion agents, and strongly acid TYPE II cation agents.

An advantage of the process is that substantially commercial grade monobasic potassium phosphate is produced due to the nature of the ion exchange process in which only an acceptable amount of impurities are carried over into the product. As a result, the purification procedures ordinarily necessary to produce commercial grade phosphoric acid from that produced in the wet process are eliminated and all of the phosphoric acid is utilized in producing a saleable product. Likewise, impure potassium sulfate can be used in the process with crystallization and other recovery and purification steps eliminated. Further, use can be made of the desilication product which is ordinarily discarded in processes for recovering aluminum from alunite. The invention results in a significant economical improvement to the recovery of monobasic potassium phosphate from apatite rock and the recovery of aluminum from alunite. The ion exchange procedure can be regulated by known techniques as to flow rates, and other process parameters as required for commercial application.

What is claimed is:

1. A process for producing aluminum and monobasic potassium phosphate from alunite and apatite rock which comprises:
    a. reacting apatite rock with sulfuric acid to produce phosphoric acid;
    b. roasting and leaching the alunite ore to remove water and compounds of sulfur and alkali metals, including potassium sulfate;
    c. separating the residue and solution of step (b);
    d. digesting the residue from step (c) with at least one alkali metal hydroxide at a concentration and at a temperature sufficient to dissolve substantially all of the aluminum values from said solid residue;
    e. separating the liquid and solid portions of the slurry resulting from step (d);
    f. removing silica from the liquid portion resulting from step (e) leaving a desilication product which is essentially sodium aluminum silicate;
    g. separating the liquid and solid portions resulting from step (f);

h. precipitating aluminum hydroxide from the liquid portion resulting from step (g);
i. separating the aluminum hydroxide precipitate from the mother liquor resulting from step (h);
j. converting the phosphoric acid from step (a) and the potassium sulfate from step (c) by ion exchange into monobasic potassium phosphate, and
k. recovering the monobasic potassium phosphate.

2. The process of claim 1 in which the ion exchange agent is a cation exchange agent and monobasic potassium phosphate is produced by the following steps:
  a. contacting the cation exchange agent with the potassium sulfate to exchange potassium ions for cations on the cation exchange agent, and
  b. contacting the potassium loaded cation exchange agent with the phosphoric acid to replace potassium ions on the potassium loaded agent with hydrogen ions from the phosphoric acid so that $KH_2PO_4$ is formed from $K+$ and $H_2PO_4^-$ ions.

3. The process of claim 1 in which the ion exchange agent is an anion exchange agent and monobasic potassium phosphate is produced by the following steps:
  a. contacting the anion exchange agent with phosphoric acid to exchange $H_2PO_4^-$ ions on the acid for anions on the anion exchange agent, and
  b. contacting the $H_2PO_4^-$ loaded anion exchange agent with potassium sulfate to exchange $SO_4^{--}$ ions from potassium sulfate for $H_2PO_4^-$ ions on the agent so that $KH_2PO_4$ is formed from $K+$ and $H_2PO_4^-$ ions.

4. A process for recovering aluminum and monobasic potassium phosphate from alunite ore and apatite rock which comprises:
  a. reacting apatite with sulfuric acid to produce phosphoric acid;
  b. roasting and leaching alunite ore to remove water, and sulfur and alkali metal compounds;
  c. recovering potassium sulfate from the leach solution of (b) leaving a residue containing substantially all of the aluminum values;
  d. digesting the residue of (c) with an alkali metal hydroxide to convert said aluminum values to aluminate;
  e. recovering aluminum values from the aluminate;
  f. converting the phosphoric acid from step (a) and the potassium sulfate from step (c) by ion exchange into monobasic potassium phosphate, and
  g. recovering the monobasic potassium phosphate.

5. The process of claim 4 in which the ion exchange agent is a cation exchange agent and monobasic potassium phosphate is produced by the following steps:
  a. contacting the cation exchange agent with the potassium sulfate to exchange potassium ions for cations on the cation exchange agent, and
  b. contacting the potassium loaded cation exchange agent with the phosphoric acid to replace potassium ions on the potassium loaded agent with hydrogen ions from the phosphoric acid so that $KH_2PO_4$ is formed from $K+$ and $H_2PO_4^-$ ions.

6. The process of claim 4 in which the ion exchange agent is an anion exchange agent and monobasic potassium phosphate is produced by the following steps:
  a. contacting the anion exchange agent with phosphoric acid to exchange $H_2PO_4^-$ ions with the acid for anions on the anion exchange agent, and
  b. contacting the $H_2PO_4^-$ loaded anion exchange agent with potassium sulfate to exchange $SO_4^{--}$ ions with potassium sulfate for $H_2PO_4^-$ ions on the agent so that $KH_2PO_4$ is formed from $K+$ and $K_2PO_4^-$ ions.

7. The process of claim 1 in which sulfur removed in step (b) is made into sulfuric acid which is cycled to apatite leach.

8. The process of claim 1 in which the ion exchange agent used in step (j) is a solid ion exchange agent and the process is performed continuously.

9. The process of claim 4 in which the ion exchange agent used in step (f) is a solid ion exchange agent and the process is performed continuously.

10. The process of claim 1 in which in step (b) after the roasting of the ore to remove water the residue is subjected first to a reducing roast and then to an oxidizing roast prior to leaching.

11. The process of claim 1 in which in step (b) after the roasting of the ore to remove water the residue is directly leached.

12. The process of claim 4 in which in step (b) after the roasting of the ore to remove water the residue is subjected first to a reducing roast and then to an oxidizing roast prior to leaching.

13. The process of claim 4 in which in step (b) after the roasting of the ore to remove water the residue is directly leached.

* * * * *